United States Patent
Purtell

[11] 3,736,951
[45] June 5, 1973

[54] MUSHROOM-SHAPED DRAIN VALVE AND METHOD OF USING THE SAME

[76] Inventor: Rufus J. Purtell, P.O. Box 1152, Brownfield, Tex. 79316

[22] Filed: Mar. 20, 1972

[21] Appl. No.: 235,921

[52] U.S. Cl. ............137/217, 137/107, 251/333, 239/111
[51] Int. Cl. ............F16k 45/00
[58] Field of Search............137/107, 217; 239/111, 212; 251/333

[56] References Cited
UNITED STATES PATENTS 2,946,341   7/1960   Dopplmaier.....................137/217

Primary Examiner—Henry T. Klinksiek
Attorney—Charles W. Coffee

[57] ABSTRACT

A mushroom-shaped drain valve for draining irrigation pipes has nibs placed around the periphery of the flat radial surface of the cap, which is the valve seating surface. The nibs hold the seating surface up from the pipe for a greater clearence to allow the water to drain faster, and, also, enables the valve to be used upon a flat surface. The flange which holds the valve in place has radial ridges so the valve may also be used as a vent valve and the flange does not seal upon venting.

8 Claims, 3 Drawing Figures

PATENTED JUN 5 1973  3,736,951

3,736,951

MUSHROOM-SHAPED DRAIN VALVE AND METHOD OF USING THE SAME

BACKGROUND OF THE INVENTION

1. Field of the Invention

This invention relates to fluid handling and more particularly to an exhaust valve which is waste responsive. (137/107).

2. Description of the Prior Art

U.S. Pat. No. 2,646,059 to Wittner et al. discloses drain valves having a flat radial band along the periphery of a circular concave undersurface at the center of the cap. These valves are commonly and commercially available and widely used in the irrigation industry. It is necessary for the valve to set upon a curved surface, and the bottom surface of the rim of the cap will rest on the curved surface of the pipe while there is no pressure in the pipe, allowing water to pass between the pipe and the lower surface.

With Wittner et al. and all prior art embodiments I have seen commercially on the market, the water flows between only a portion of the cap and pipe because a portion of the cap rests on the pipe.

As the operation of the valve depends upon the curvature of the pipe, if the diameter of the pipe is large, the curvature will be insufficient for the cap so there is clearence for draining. Therefore, if it were desired to drain an element such as a trail tube connector, as shown in my prior U.S. Pat. Nos. 3,157,193; 3,245,608; and 3,298,388, it was necessary to provide a curved surface in the connector for the drain valve to work in connection therewith.

Also, Wittner et al. discloses their valve as a vent valve. However, it is disclosed as a vent valve with a metal washer surrounding it. The metal washer is necessary when venting, otherwise the flange of the valve presses against the pipe and prevents flow into the pipe when the pipe is being drained.

SUMMARY OF THE INVENTION

New and Different Function

I have invented a valve made of rubber which has a flat sealing surface which is a circular band extending radially along the bottom edge of the cap. (By the term "rubber," I mean in no way to restrict myself to natural rubber, but intend to include a wide range of flexible material of either natural or synthetic origin). On the edge of this flat band sealing surface, I have found that placing a series of nibs or teats along the peripherial edge improves the valve. The valve then can be used in large diameter pipe or upon a flat surface. At low pressure, the nibs hold the valve up so there is a clearence for waste water flow. The nibs prevent the valve from resting upon any part of its sealing surface while draining, allowing the valve to release fluid around the full 360° of its sealing surface. At increased pressures, the cap is forced down so the valve seals. The band is wide enough so there is good sealing, the nibs being made of the same rubber material as the cap itself so they flex sufficiently to permit the seal to be made.

Therefore, with the drain valve of the present invention, it would be feasible to use the drain valve to drain a connection, such as a trail tube connector, on a flat surface thereof and thereby eliminate the necessity for special construction.

Also, the flange is made with radial ridges so the flange will not seal against the outside surface of the pipe. This increases the value of the valve when it is being used on the top of the pipe as a vacuum breaker or to vent air into the pipe at the time the pipe is being drained.

OBJECTS OF THE INVENTION

An object of this invention is to provide an automatic drain and vent for irrigation pipe.

Another object is to provide a valve which is useful for drain and vent of large diameter pipes or apparatuses with flat surfaces.

Further objects are to achieve the above with a device that is sturdy, compact, durable, lightweight, simple, efficient, versatile, and reliable, yet inexpensive and easy to manufacture, install, and maintain.

Still further objects are to achieve the above with a method that is versatile, rapid, efficient, and inexpensive, and does not require skilled people to install, adjust, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 1:
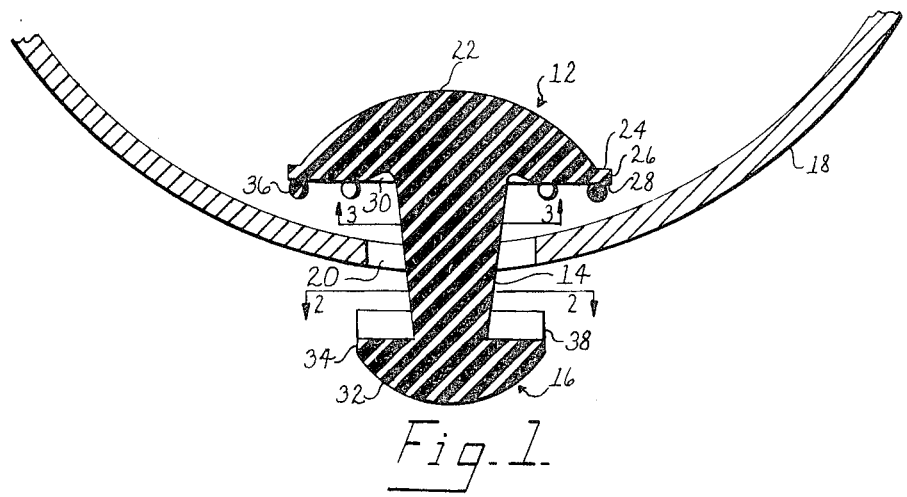
FIG. 1 is a sectional view of a valve according to this invention shown in a pipe (partially shown) taken substantially on line 1—1 of FIGS. 2 and 3.
Figure 2:
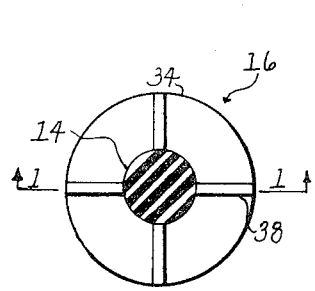
FIG. 2 is a sectional view thereof taken substantially on line 2—2 of FIG. 1.
Figure 3:
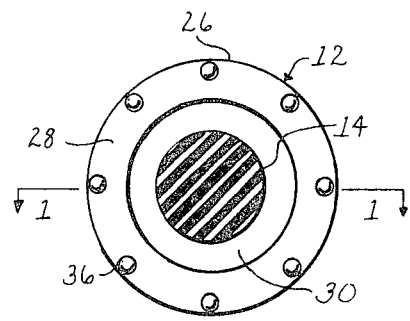
FIG. 3 is a sectional view thereof taken substantially on line 3—3 of FIG. 1.

Referring to the drawing, there may be seen that the valve according to this invention has basically three parts: cap 12, stem 14, and flange 16.

The cap 12 is the heavier portion which, in operation, is within pipe or vessel 18. According to this specification "vessel" will be used as the broad term which will include a sprinkler connection as seen in my U.S. Pat. No. 3,298,388 or it is intended in this specification that the term "vessel" be broad enough to include the pipe itself or any other container. A pipe is illustrated in the drawing.

Stem 14 extends through hole 20 in the vessel 18. It will be understood that the hole 20 is larger in diameter than the stem 14, but it is smaller in diameter than the cap 12 and the flange 16, all as described in Wittner et al., U.S. Pat. No. 2,646,059. The flange 16 is on the outside of the vessel 18.

The cap 12 is circular. The top 22 of the cap is spherical in shape. The edge or perimeter of the cap has a thin lip 24. I.e., the top 22 is not of a continuous convex arc, but adjacent the edge or lip 24 it is flat or concave so the lip 24 is thinner than it otherwise would be and therefore, more flexible. There is a small peripherial cylindrical edge 26. On the underside of the cap 12 there is a flat, radial seating surface 28. This seat 28 extends from the edge 26 toward the center of the cap. It is a flat plane radial surface. I have had good success with the width of the seat 28 about one-eighth the diameter of the cap or about one-fourth the radial distance. Also, the diameter of the stem 14 is about 30 percent of the diameter of the cap itself.

Inside the seat 28, the interior of the cap 12 forms arcuate concave portion 30 and is basically spherical in nature. The stem 14 is circular in cross section and tapered. Stated otherwise, it is generally conical with the larger end connecting at the cap 12 and the smaller end connecting to the flange 16.

The flange 16 is the same basic outline as the cap, at least it has spherical top 32 and a cylindrical peripherial edge 34. It does not, however, have the thin lip. I have had good success making the flange about two-thirds the diameter of the cap. The diameter of the stem is about 40 percent of the diameter of the flange at its point of connection.

A series of eight teats or legs or nibs 36 are spaced at the extreme outer edge of the seat 28. The nibs 36 are hemispherical in configuration and the diameter of the nibs is about half or a third the width of the seat 28. Inasmuch as they are on the outer edge of the band forming the seat 28, they are on that portion which is lip 24 of the cap 12 and therefore, the cap has more flexibility or pliance at the nibs 36.

As described before, when there is no pressure within the vessel 18, the cap 12 stands up on its own legs, i.e., the nibs 36 against the inside surface of the vessel 18. When pressure is applied within the vessel, the cap 12 presses against the inside surface of the vessel 18 and the seat 28 forms a seal between the cap 12 and the vessel as is known to the prior art as illustrated in Wittner et al. The seat 28 is wider than the valves presently available on the market so there is ample room for seating and sealing with the nibs 36. Furthermore, the action of the pressure upon the cap causes the edge 26 of the cap to roll upward and out of the way as it presses down in position. Therefore, the cap 12 is operable upon a pipe of large diameter or a vessel with a flat surface. Also on normal diameter pipes, there is a faster flow of water on draining because the nibs 36 cause a greater clearance between the seat 28 and the interior surface of the pipe 18.

The particular arrangement results in less tilt of the valve with the flow of water when there is no pressure and the valve is not sealed. This is desirable.

The underside of the flange 16 has a series (i.e., four) of raised ribs or ridges 38 extending radially outward from the stem 14 to the edge 34. These ridges prevent the flange from seating flatly and sealing against the outer surface of the vessel 18; therefore if the valve is placed through a hole in the top of the vessel 18 as a vacuum breaker which permits air to enter the pipe, it may be seen that air is free to flow around the flange. Air having less viscosity than water, it is not nearly so critical to provide for a rapid flow; almost any opening will be sufficient for the flow of air.

The embodiment shown and described above is only exemplary, I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a mushroom-shaped rubber drain valve adapted to be inserted through a hole in a vessel to be drained, said valve having
   a. a circular cap having a radial face,
   b. said cap adapted to be in the vessel in use,
   c. an integral stem co-axially with the cap, and
   d. a circular integral flange having a face,
   e. said flange on the stem opposite the cap and adapted to be outside the vessel in use;
   f. The improvement comprising:
   g. a series of nibs along the radial face of the cap attached to the stem,
   h. so that in use the radial face of the cap is elevated from the interior of the vessel while draining.

2. The invention as defined in claim 1 with the additional limitation of
   j. a series of radial ridges along the face of the flange attached to the stem,
   k. so that in use the face of the flange is held from the exterior of the vessel.

3. The invention as defined in claim 2 with the additional limitations of
   m. a lip extending along the periphery of the cap,
   n. the lip thinner than the remainder of the cap,
   o. the nibs along the underside of the lip.

4. The invention as defined in claim 3 with the additional limitation of
   p. the underside of the cap concave.

5. In a mushroom-shaped rubber drain valve adapted to be inserted through a hole in a vessel to be drained, said valve having
   a. a circular cap,
   b. said cap adapted to be in the vessel in use,
   c. an integral stem co-axially with the cap, and
   d. a circular integral flange having a face,
   e. said flange on the stem opposite the cap and adapted to be outside the vessel in use;
   f. The improvement comprising:
   g. a series of radial ridges along the face of the flange attached to the stem,
   h. so that in use the face of the flange is held from the exterior of the vessel while venting.

6. The method of draining fluid from and sealing a hole in the bottom of a vessel comprising:
   a. placing a rubber valve over the hole with a cap on the valve in the vessel,
   b. maintaining the valve in proper position with a stem integral with the valve extending through the hole,
   c. elevating the cap of the valve from the interior surfaces of the vessel by flexible nibs on the cap of the valve,
   d. allowing fluid to flow between the interior surface of the vessel and the bottom of the cap of the valve, and
   e. sealing the hole in the vessel responsive to pressure within the vessel by causing the pressure to force the valve cap downward, thereby spreading the edge of the cap with the nibs extending outward.

7. The invention as defined in claim 6 with the additional limitation of
   f. elevating the cap from the interior a full 360° around the cap, and
   g. allowing fluid to flow a full 360° around the cap of the valve.

8. The method of venting air into and sealing a hole in the top of a vessel comprising:

a. placing a rubber valve over the hole with a cap on the valve in the vessel,
b. maintaining the valve in proper position with a stem integral with the valve extending through the hole,
c. having a flange on the stem outside the vessel to prevent the stem from falling through the hole,
d. elevating the flange from the exterior surface of the vessel by radial ridges on the flange,
e. allowing air to flow between the radial ridges and the exterior surface of the vessel, and
f. sealing the hole in the vessel responsive to pressure within the vessel by causing the pressure to force the valve cap outward, thereby
g. sealing the cap against the interior surface of the vessel.

* * * * *